Patented Jan. 10, 1939

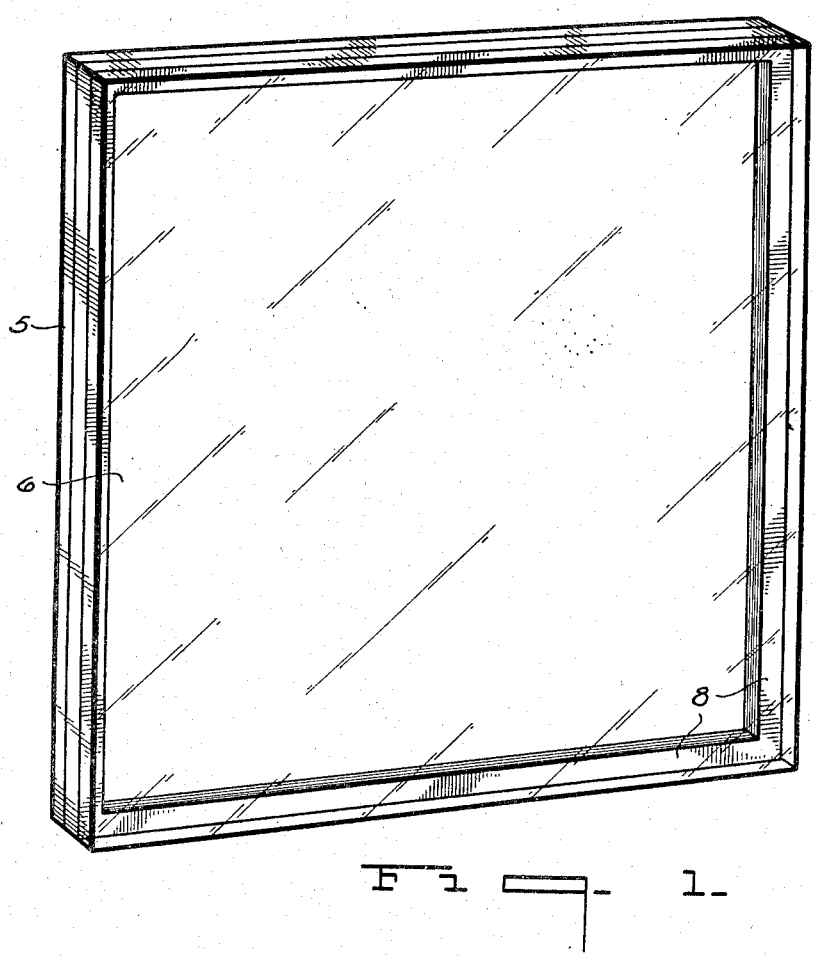

2,143,747

UNITED STATES PATENT OFFICE 2,143,747

DOUBLE SASH GLAZING

George B. Watkins, Toledo, Ohio, assignor to Libbey-Owens-Ford Glass Company, Toledo, Ohio, a corporation of Ohio Application September 20, 1934, Serial No. 744,837

5 Claims. (Cl. 20—56.5)

The present invention relates to double glazing and particularly to an improved form of double glazing window.

As is well understood in the art, the expression "double glazing" has reference to a window including two sheets or plates of glass arranged face to face but slightly spaced from one another to provide an air-tight chamber or space therebetween. The space between the two sheets or plates of glass is preferably hermetically sealed by providing a suitable seal around the edges only thereof. In practice, the two sheets of glass may be installed in the sash as a unit (having been previously assembled in parallel and the edges thereof sealed) or the sheets may be fitted separately in the sash on the job. Likewise, the air between the glass sheets may be dehydrated or exhausted to provide a partial vacuum.

The use of double glazing has long been desirable as it has the effect of greatly retarding the escape of heat therethrough from the inside of a building during the winter as well as minimizing the passage of heat into the building from the outside during the summer. This is due to the fact that the air-tight space between the glass sheets (whether filled with air or exhausted to create a partial vacuum) is an exceedingly poor conductor of heat and also of cold so that a double glazed window possesses much greater insulating properties than a single sheet or plate of glass.

The glass sheets used in double glazing may be either plate glass or window glass; plate glass differing from window glass in that its opposite surfaces are ground and polished to render them plane and optically true. Ordinary plate and window glass consists of a soda-lime-silica glass which contains alkalies, soda, potash, etc. Since these latter elements have the greatest effect of any of the elements on the expansion coefficient of glasses, it will be seen that soda-lime-silica glasses are high expansion glasses. Also, that low expansion glasses are therefore necessarily of low alkali content. Glasses of high expansion are known as alkaline or basic glasses, while glasses of low expansion are known as acid glasses.

The successful use of double glazing is dependent largely upon the maintaining of the space between the two sheets of glass hermetically sealed since should this seal be broken, permitting air to enter and circulate between the glass sheets, the efficiency or insulating effect of the double glazing would be materially reduced. When using ordinary soda-lime-silica glass in double glazed windows, the glass sheets will have a relatively high coefficient of expansion with relatively low heat absorption. Due to the relative difference in temperature to which the inside and outside sheets are subjected, there will be a material difference in the expansion and contraction thereof, resulting in relative movement between the sheets tending to either break or weaken the seal around the edges thereof. In other words, when using two sheets of glass having the same heat absorbing and expansion characteristics, it will be apparent that when the sheets are subjected to different temperatures, the expansion and contraction thereof will also be different. For instance, during the summer the outside sheet will be subjected to the sun's heat rays, whereas the inside sheet will be relatively cooler. Inasmuch as the two sheets have the same coefficient of expansion, the outer sheet will undergo a greater degree of expansion due to its increased temperature than the inner sheet, thereby causing relative movement therebetween, tending to impart a stress and strain to the seal around the edges of the double glazing.

It is the aim of this invention to provide an entirely new type of double glazed window wherein the two sheets of glass employed possess different heat absorption and expansion characteristics, said sheets being so positioned relative to one another and with respect to the opening to be glazed that there will be a minimum of movement between the two lights of glass, thereby eliminating any tendency to break or weaken the seal around the edges of the sheets while at the same time affording maximum insulation.

Other objects and advantages of the invention will be apparent from the following description when taken in connection with the accompanying drawing, wherein:

Fig. 1 is a perspective view of a double glazing unit embodying the present invention, and Fig. 2 is a transverse section therethrough.

More specifically, the present invention contemplates the provision of a double glazed window including one sheet of low expansion, heat absorbing glass in combination with a sheet of ordinary soda-lime-silica glass, with the sheet of low expansion, heat absorbing glass being positioned to the outside of the window or glazing unit.

With reference to the drawing, there is illustrated a double sash glazing unit including the two sheets of glass 5 and 6 arranged face to face but slightly spaced from one another to provide the air space 7 therebetween. The two sheets of glass are maintained in predetermined spaced relation by suitable separator strips 8 arranged between the glass sheets around the edges thereof. These separator strips may be formed of rubber, fabric, or the like and are bonded to the glass by a suitable cement or adhesive whereby to hermetically seal the space between the glass sheets. The air within this space may be either dehydrated or exhausted to provide a partial vacuum.

As brought out above, when using a double glazing unit of this character, the sheet of glass positioned interiorly of the glazed opening will be subjected to a different temperature than that to which the outer sheet is exposed. Therefore, one sheet of glass expands or contracts to a greater or lesser extent than the other sheet, with the result that a decided strain is placed upon the bond between the glass sheets and the separator strips cemented therebetween. This differential in expansion and contraction of the two sheets of glass tends to break down the seal or bond between the glass and the separator strips, disrupting the desired conditions set up within the space therebetween and adversely affecting the efficiency of the unit.

According to the present invention, the strain placed upon the edge sealing means is greatly reduced if not entirely eliminated by employing sheets of glass having different heat absorbing and expansion characteristics to the end that although subjected to different temperatures, the degree of expansion and contraction of the two sheets of glass will be substantially the same. With this end in view, one of the glass sheets, for example sheet 5, is preferably a low expansion, heat absorbing glass, while the sheet 6 is of ordinary soda-lime-silica glass.

Although the low expansion, heat absorbing glass used need not be of any specific composition or percentages, yet the following is one preferred example of a glass of this character which can be satisfactorily used:

| | Per cent |
|---|---|
| Silica, $SiO_2$ | 76 |
| Soda, $Na_2O$ | 5 |
| Boric oxide, $B_2O_3$ | 9 |
| Zinc oxide, $ZnO$ | 6 |
| Calcium oxide, $CaO$ | 2 |
| Ferrous oxide, $FeO$ | 1 |
| Alumina, $Al_2O_3$ | 1 |

In the above glass, the 1% of ferrous oxide (FeO) would be equivalent to 1.11% ferric oxide ($Fe_2O_3$). The iron oxide content of this glass differs according to the thickness of the glass; the 1/8" plate running 0.55% ferric oxide and the 3/16" about 0.3%.

The above glass is a low expansion borosilicate glass which is extremely resistant to weathering. This glass is very effective in absorbing infra-red radiation and also has a coefficient of expansion approximately half that of ordinary soda-lime-silica glasses.

As brought out above, one sheet of this heat absorbing, low expansion glass is adapted to be used in combination with a sheet of ordinary soda-lime-silica glass. An example of a soda-lime-silica glass which may be satisfactorily used is as follows, although the invention is not limited to this specific composition:

| | Per cent |
|---|---|
| Silica, $SiO_2$ | 71.64 |
| Ferric oxide, $Fe_2O_3$ | 0.043 |
| Alumina, $Al_2O_3$ | .29 |
| Titanium oxide, $TiO_2$ | .020 |
| Calcium oxide, $CaO$ | 10.03 |
| Magnesium oxide, $MgO$ | 4.30 |
| Sodium oxide, $Na_2O$ | 12.89 |
| Arsenic oxide, $As_2O_5$ | 0.36 |
| Sulphuric oxide, $SO_3$ | 0.42 |

When using a sheet of this soda-lime-silica glass in combination with a sheet of the low expansion borosilicate glass described above, the sheet of borosilicate glass is glazed to the outside of the window or double glazing unit.

During the summer, the sheet of low expansion glass will act to absorb the infra-red radiation and prevent it from passing to and heating up the inner sheet of soda-lime-silica glass. Due to the absorption of the infra-red or heat rays, the outer sheet of glass will absorb the energy of these rays so that, as a result, it will be raised to a relatively higher temperature and be relatively warmer than would be a sheet of ordinary soda-lime-silica glass were it glazed to the outside. However, due to the higher coefficient of expansion of the soda-lime-silica glass, it will undergo a greater expansion in proportion to its temperature than will the outer sheet of low expansion glass. Consequently, the warmer sheet of low expansion glass will not expand appreciably more than the cooler inner sheet of high expansion glass. In fact, the expansion of the two sheets will be substantially the same. Such being the case, there will be a minimum of movement between the two lights of glass, with the result that any tendency to break or weaken the seal around the edges of the two sheets of glass will be reduced to a minimum.

Also, inasmuch as the outer sheet of low expansion glass absorbs substantially all of the infra-red or heat rays, very little of these rays will be transmitted to the inner sheet of glass, thereby providing maximum insulation and efficiency in addition to being highly desirable in maintaining a hermetically sealed unit. Furthermore, as pointed out above, the borosilicate, low expansion glass is extremely resistant to weathering.

The combination of a sheet of heat absorbing, low expansion glass and a sheet of ordinary soda-lime-silica glass, with the former glazed to the outside of the window also works to advantage in the winter time as well as in the summer time. Thus, when the outside temperature is low compared to the temperature of the glass on the inside, there will be less tendency for the outer sheet to contract or shrink due to the low coefficient of expansion of the heat absorbing glass. In other words, were two sheets of ordinary soda-lime-silica glass used, the ouside sheet would tend to shrink or contract to a relatively greater degree than would a sheet of the heat absorbing, low expansion glass. Consequently, the use of a sheet of heat absorbing, low expansion glass on the outside of the window will result in less shrinkage or contraction so that relative movement between the sheets will be more nearly equal. By equalizing or substantially equalizing the expansion and contraction of the two sheets of glass, a more efficient double glazed unit will be provided affording maximum insulation as well as reducing to a minimum the liability of breaking the seal around the edges of the two sheets of glass and the lessening of the insulating effect incident thereto.

I claim:

1. A double glazed window including two sheets of glass having a hermetically sealed space therebetween, one of said sheets being of a low expansion, heat absorbing glass and the other sheet being of ordinary soda-lime-silica glass, with the heat absorbing glass glazed to the outside of the window.

2. A double glazed window including two sheets of glass having a hermetically sealed space therebetween, one of said sheets being of a heat absorbing borosilicate glass and the other sheet being of ordinary soda-lime-silica glass, with the sheet of borosilicate glass glazed to the outside of the window.

3. A double glazed window including two sheets of glass having a hermetically sealed space therebetween, one of said sheets being of ordinary soda-lime-silica glass and the other sheet being of a heat absorbing glass having a lower coefficient of expansion than the sheet of ordinary soda-lime-silica glass.

4. A double glazed window including two sheets of glass having a hermetically sealed space therebetween, one of said sheets being of ordinary soda-lime-silica glass and the other sheet being of a heat absorbing borosilicate glass having a lower coefficient of expansion than the sheet of ordinary soda-lime-silica glass.

5. A double glazed window including two sheets of glass having a hermetically sealed space therebetween, one of said sheets being of a glass having a coefficient of expansion and heat absorbing characteristics comparable to that of ordinary soda-lime-silica glass, and the other sheet being of a heat absorbing glass having a relatively lower coefficient of expansion.

GEORGE B. WATKINS.